United States Patent
Abedini et al.

(10) Patent No.: US 10,805,136 B2
(45) Date of Patent: Oct. 13, 2020

(54) MULTIPLEXING PAGING SIGNALS WITH SYNCHRONIZATION SIGNALS IN NEW RADIO

(71) Applicant: QUALCOMM Incorporated, San Diego, CA (US)

(72) Inventors: Navid Abedini, Raritan, NJ (US); Muhammad Nazmul Islam, Edison, NJ (US); Sundar Subramanian, San Diego, CA (US); Bilal Sadiq, Basking Ridge, NJ (US); Juergen Cezanne, Ocean Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/976,244

(22) Filed: May 10, 2018

(65) Prior Publication Data
US 2018/0331875 A1    Nov. 15, 2018

Related U.S. Application Data

(60) Provisional application No. 62/521,260, filed on Jun. 16, 2017, provisional application No. 62/505,853, filed on May 13, 2017.

(51) Int. Cl.
| | | |
|---|---|---|
| *H04L 27/26* | (2006.01) | |
| *H04W 68/02* | (2009.01) | |
| *H04W 8/24* | (2009.01) | |
| *H04W 68/00* | (2009.01) | |

(Continued)

(52) U.S. Cl.
CPC ...... *H04L 27/2662* (2013.01); *H04L 27/2613* (2013.01); *H04L 27/2692* (2013.01); *H04W 8/245* (2013.01); *H04W 68/005* (2013.01); *H04W 68/02* (2013.01); *H04W 8/14* (2013.01); *H04W 74/0833* (2013.01)

(58) Field of Classification Search
CPC ... H04W 68/005; H04W 8/245; H04W 68/02; H04W 74/0833; H04W 8/14; H04L 27/2662; H04L 27/2613; H04L 27/2692
See application file for complete search history.

(56) References Cited

U.S. PATENT DOCUMENTS

| | | |
|---|---|---|
| 8,811,252 B2 | 8/2014 | Maeda et al. |
| 2007/0190967 A1* | 8/2007 | Cho ............... H04L 5/0048 455/403 |

(Continued)

OTHER PUBLICATIONS

International Search Report and Written Opinion—PCT/US2018/032228—ISA/EPO—dated Jul. 24, 2018.

(Continued)

*Primary Examiner* — Brian D Nguyen
(74) *Attorney, Agent, or Firm* — Patterson + Sheridan, LLP

(57) ABSTRACT

Certain aspects of the present disclosure relate to methods and apparatus for multiplexing new radio (NR) synchronization signals and paging signals. A Base Station (BS) decides whether or not to multiplex paging and synchronization signals in a set of time resources, a set of frequency resources or a combination thereof, the deciding based on at least one of a capability of the BS, a capability of at least one User Equipment (UE) served by the BS, an operating frequency band or a combination of tone spacings of the paging signals and the synchronization signals.

87 Claims, 11 Drawing Sheets

(51) Int. Cl.
*H04W 74/08* (2009.01)
*H04W 8/14* (2009.01)

(56) References Cited

U.S. PATENT DOCUMENTS

| | | | | |
|---|---|---|---|---|
| 2011/0310837 | A1* | 12/2011 | Classon | H04L 1/1822 |
| | | | | 370/329 |
| 2013/0208694 | A1* | 8/2013 | Park | H04W 74/004 |
| | | | | 370/329 |
| 2017/0070934 | A1* | 3/2017 | Luo | H04W 36/18 |
| 2017/0164364 | A1* | 6/2017 | Song | H04W 4/70 |
| 2017/0265136 | A1* | 9/2017 | Elsayed | H04W 52/0229 |
| 2017/0272221 | A1* | 9/2017 | Yi | H04L 5/0048 |
| 2018/0279286 | A1* | 9/2018 | Akoum | H04W 74/0833 |
| 2018/0302785 | A1* | 10/2018 | Larmo | H04W 8/24 |
| 2019/0090218 | A1* | 3/2019 | Noh | H04L 27/0006 |

OTHER PUBLICATIONS

Mediatek Inc: "Consideration on Paging Design and Transmission", 3GPP Draft; R1-1704439 Consideration on Paging Design and Transmission, 3rd Generation Partnership Project (3GPP), Mobile Competence Centre; 650, Route Des Lucioles; F-06921, Sophia-Antipolis Cedex; France, RAN WG1, No. Spokane, USA; 20170403-20170407 Apr. 2, 2017, XP051242586, Retrieved from the Internet: URL:http://www.3gpp.org/ftp/Meetings_3GPP_SYNC/RAN1/Docs/ [retrieved on Apr. 2, 2017]. 3 pages.

ZTE et al., "Paging in NR", 3GPP Draft; R1-1701579, 3rd Generation Partnership Project (3GPP), Mobile Competence Centre; 650, Route Des Lucioles; F-06921, Sophia-Antipolis Cedex; France, RAN WG1, No. Athens, Greece; 20170213-20170217 Feb. 12, 2017, XP051208746, Retrieved from the Internet: URL:http://www.3gpp.org/ftp/Meetings_3GPP_SYNC/RAN1/Docs/ [retrieved on Feb. 12, 2017], 7 pages.

* cited by examiner

MULTIPLEXING PAGING SIGNALS WITH SYNCHRONIZATION SIGNALS IN NEW RADIO

This application claims priority to U.S. Provisional Application Ser. No. 62/505,853, entitled "MULTIPLEXING PAGING SIGNALS WITH SYNCHRONIZATION SIGNALS IN NEW RADIO", filed on May 13, 2017, and U.S. Provisional Application Ser. No. 62/521,260, entitled "MULTIPLEXING PAGING SIGNALS WITH SYNCHRONIZATION SIGNALS IN NEW RADIO", filed on Jun. 16, 2017, which are expressly incorporated by reference in their entirety.

FIELD

The present disclosure relates generally to wireless communication systems, and more particularly, to methods and apparatus for multiplexing paging signals with synchronization signals in a new radio (NR) system.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or $5^{th}$ generation (5G) network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a base station (BS). The method generally includes deciding whether or not to multiplex paging signals and synchronization signals in a set of time resources, a set of frequency resources or a combination thereof, the deciding based on at least one of a capability of the BS, a capability of at least one User Equipment (UE) served by the BS, an operating frequency band or a combination of tone spacings of the paging signals and the synchronization signals, and multiplexing the paging signals and the synchronization signals based on the decision.

Certain aspects provide a method for wireless communications by a user equipment (UE). The method generally includes transmitting at least one capability of the UE for use in deciding whether or not paging signals and synchronization signals are multiplexed at a base station (BS), and processing multiplexed paging signals and synchronization signals received at the UE, based on the at least one capability of the UE.

Certain aspects of the present disclosure provide an apparatus for wireless communication by a base station (BS). The apparatus generally includes means for deciding whether or not to multiplex paging signals and synchronization signals in a set of time resources, a set of frequency resources or a combination thereof, the deciding based on at least one of a capability of the BS, a capability of at least one User Equipment (UE) served by the BS, an operating frequency band or a combination of tone spacings of the paging signals and the synchronization signals; and means for multiplexing the paging signals and the synchronization signals based on the decision.

Certain aspects of the present disclosure provide an apparatus for wireless communication by a User Equipment (UE). The apparatus generally includes means for transmitting at least one capability of the UE for use in deciding whether or not paging signals and synchronization signals are multiplexed at a base station (BS); and means for processing multiplexed paging signals and synchronization signals received at the UE, based on the at least one capability of the UE.

Certain aspects of the present disclosure provide an apparatus for wireless communication by a base station (BS). The apparatus generally includes at least one processor at a memory coupled to the at least one processor. The at least one processor is generally configured to decide whether or not to multiplex paging signals and synchronization signals in a set of time resources, a set of frequency resources or a combination thereof, the deciding based on at least one of a capability of the BS, a capability of at least one User Equipment (UE) served by the BS, an operating frequency band, or a combination of tone spacings of the paging signals and the synchronization signals; and multiplex the paging signals and the synchronization signals based on the decision.

Certain aspects of the present disclosure provide an apparatus for wireless communication by a User Equipment (UE). The apparatus generally includes at least one processor at a memory coupled to the at least one processor. The at least one processor is generally configured to transmit at least one capability of the UE for use in deciding whether or not paging signals and synchronization signals are multiplexed at a base station (BS); and process multiplexed paging signals and synchronization signals received at the UE, based on the at least one capability of the UE.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
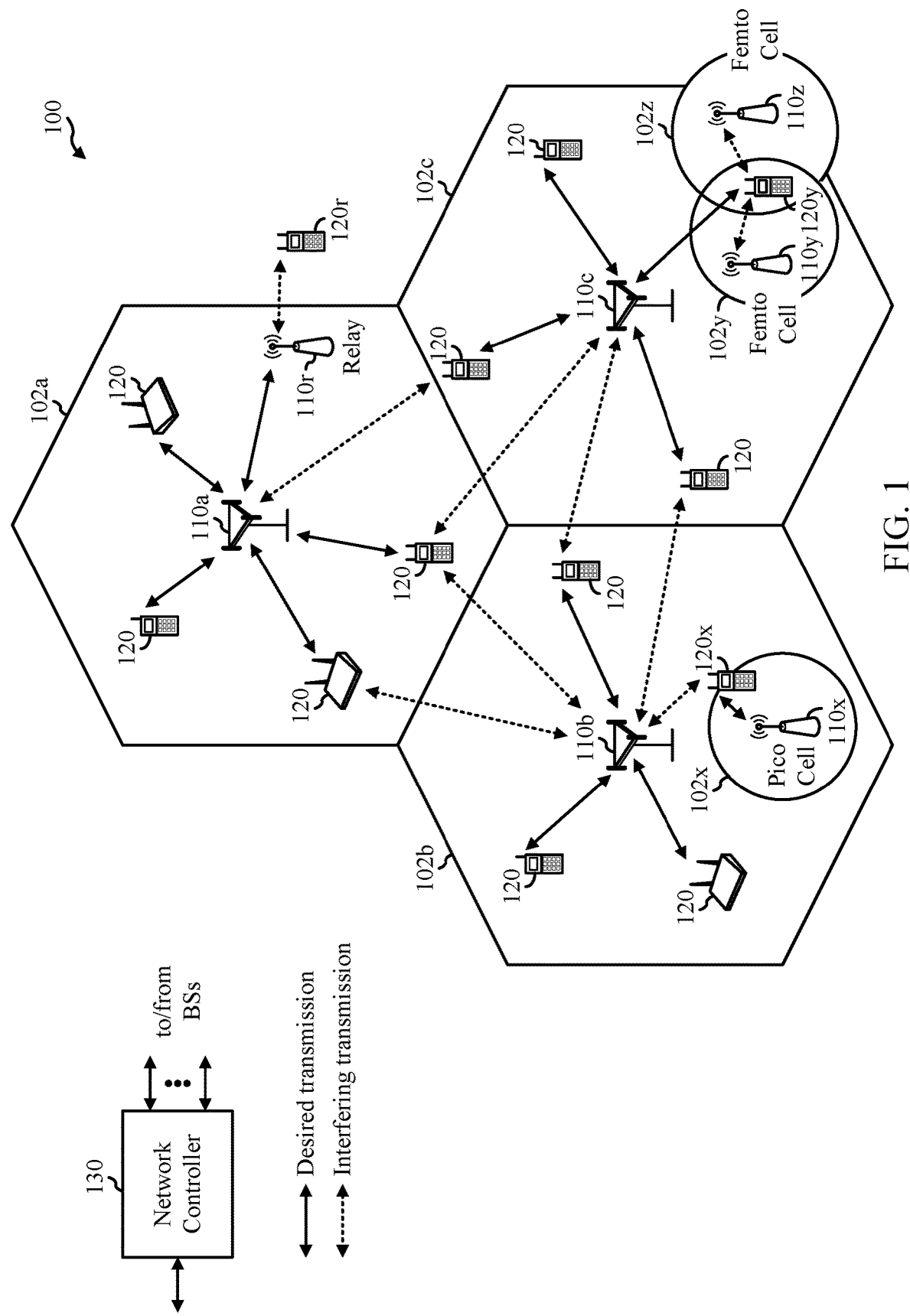
FIG. 1 is a block diagram conceptually illustrating an example telecommunications system, in accordance with certain aspects of the present disclosure.

In NR systems, like synchronization signals, paging signals are also broadcasted because the locations of UEs (e.g., in Radio Resource Control, RRC-idle mode) is unknown. So, in high frequency bands (e.g., above 6 GHz) where transmissions are beamformed, paging transmissions are directional. Since the paging signals, like synchronization signals, are broadcasted, they need to be transmitted via beam sweeping like synchronization signals. For beam sweeping, a base station (e.g., gNB) transmits beams in different direction to cover a sufficient angular region. However, beam sweeping requires a large resource overhead which may not be optimal and may lead to inefficiencies including reduced throughput.

One solution to reduce resource overhead as a result of beam sweeping while transmitting paging signals is to multiplex paging signals with synchronization signals. For example, paging signals may be frequency division multiplexed (FDM) with synchronization signals. However, there may be certain limitations and drawbacks to multiplexing (e.g., FDM) paging signals and synchronization signals.

Certain aspects of the present disclosure discuss techniques for multiplexing paging signals and synchronization signals based on at least one of a capability of a base station, a capability of a UE (e.g., served by the BS), or a combination of tone spacings of the paging and the synchronization signals.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth (e.g., system frequency band) into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
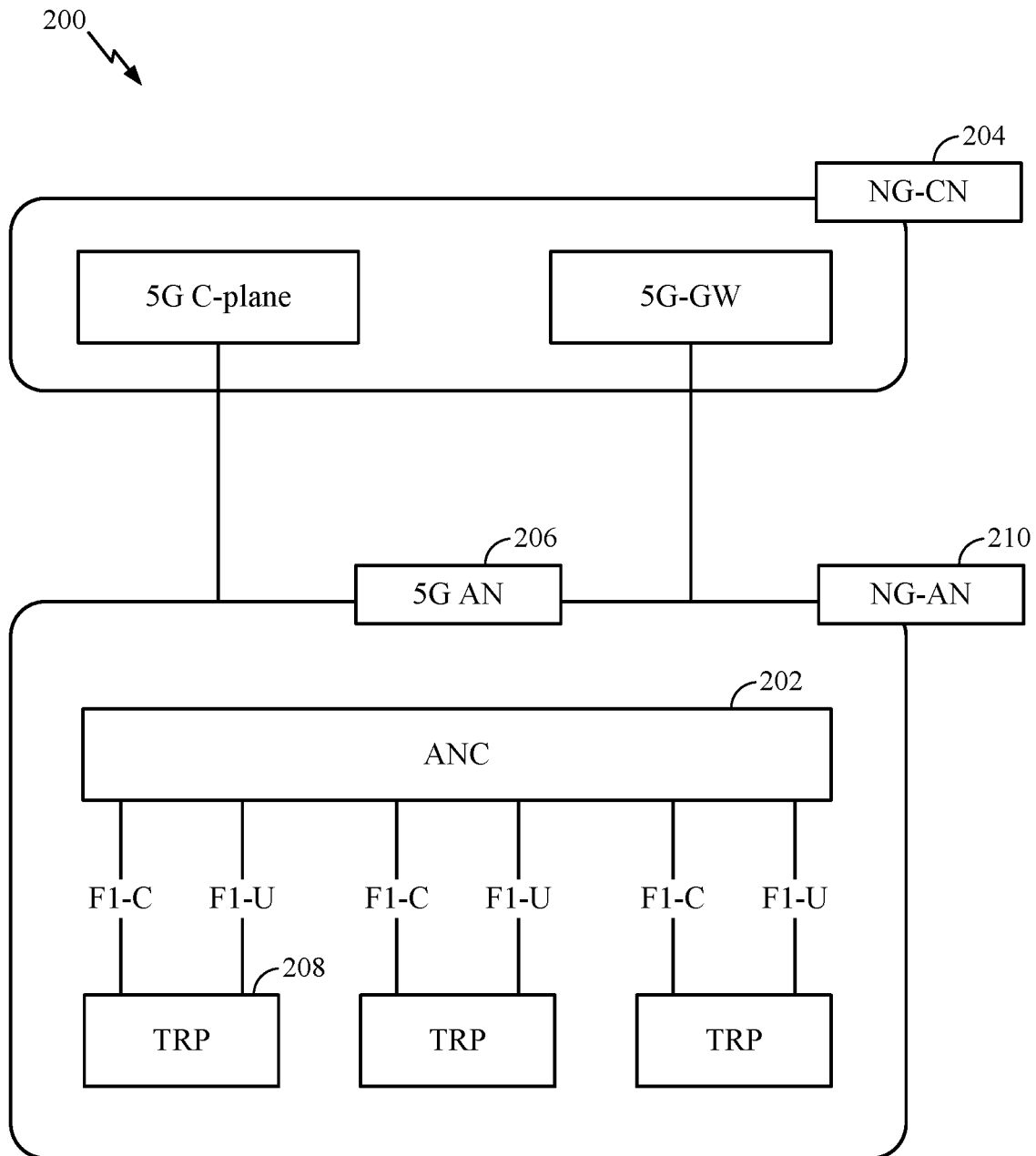
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
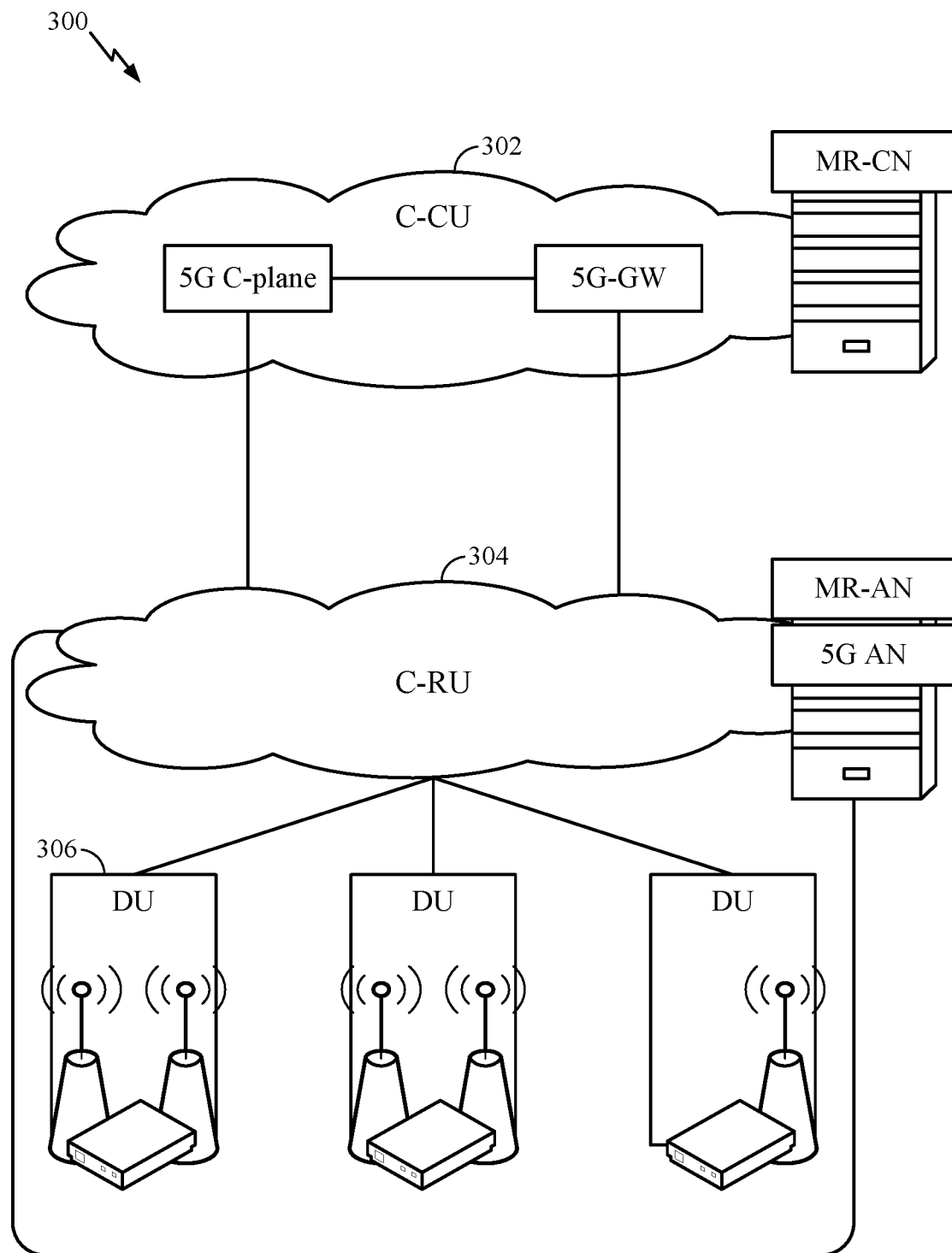
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
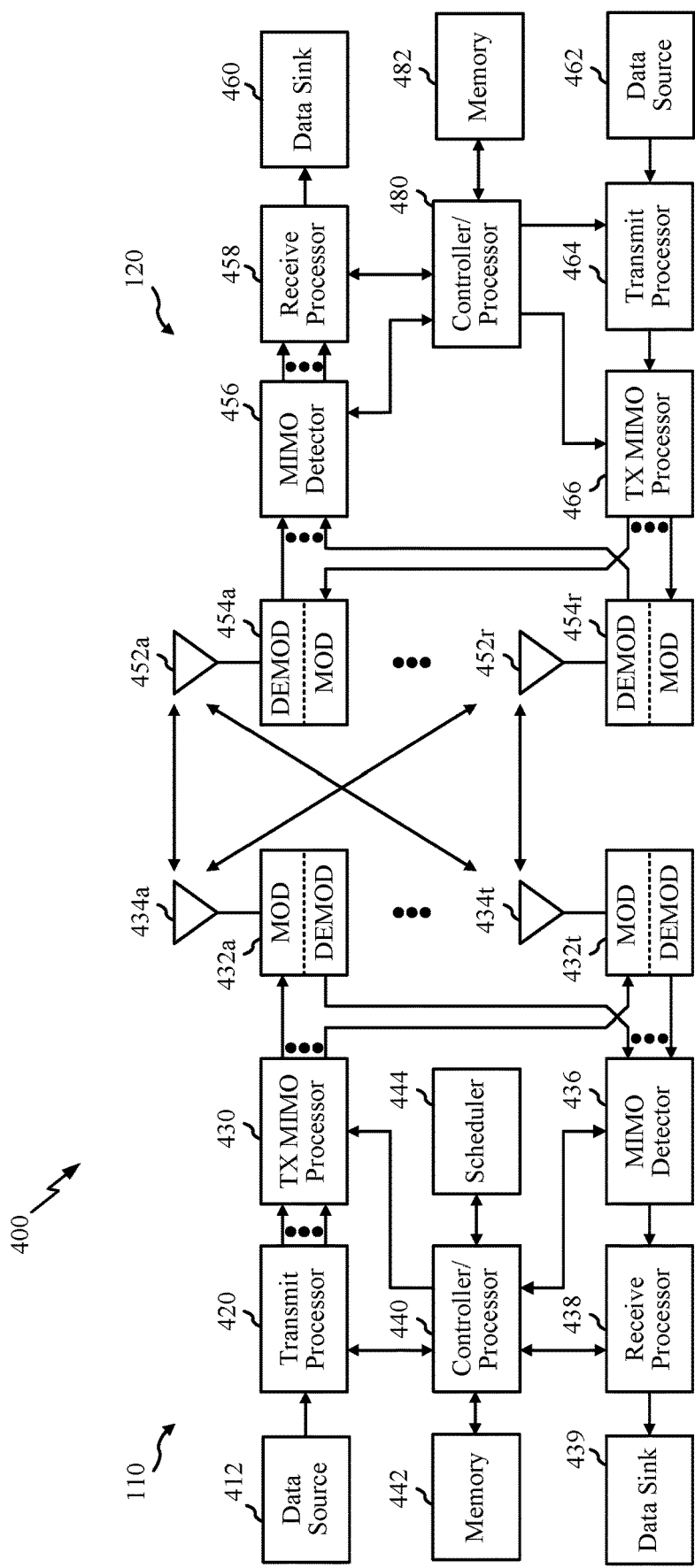
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 8-11.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIGS. 10-11, and/or other processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
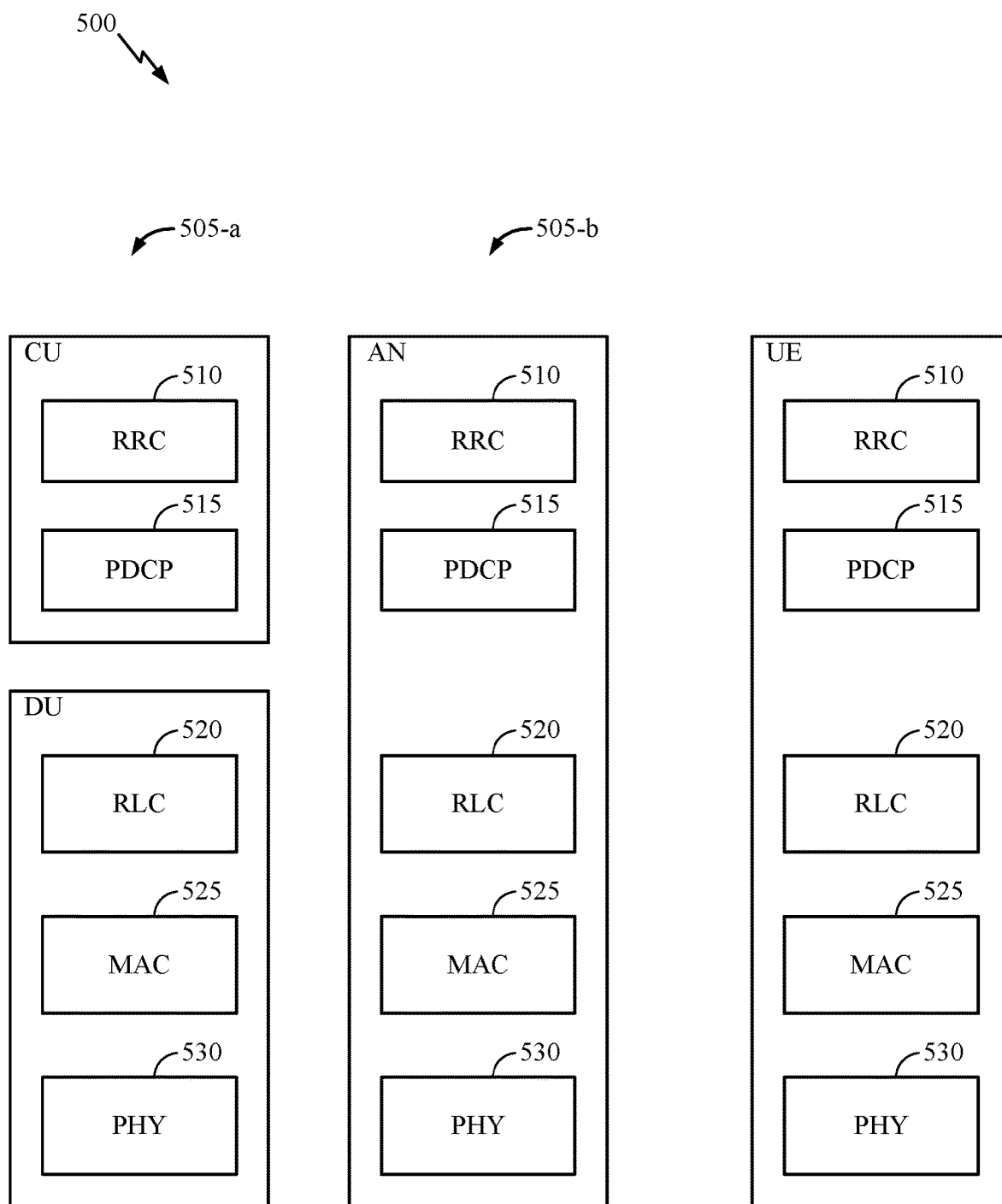
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
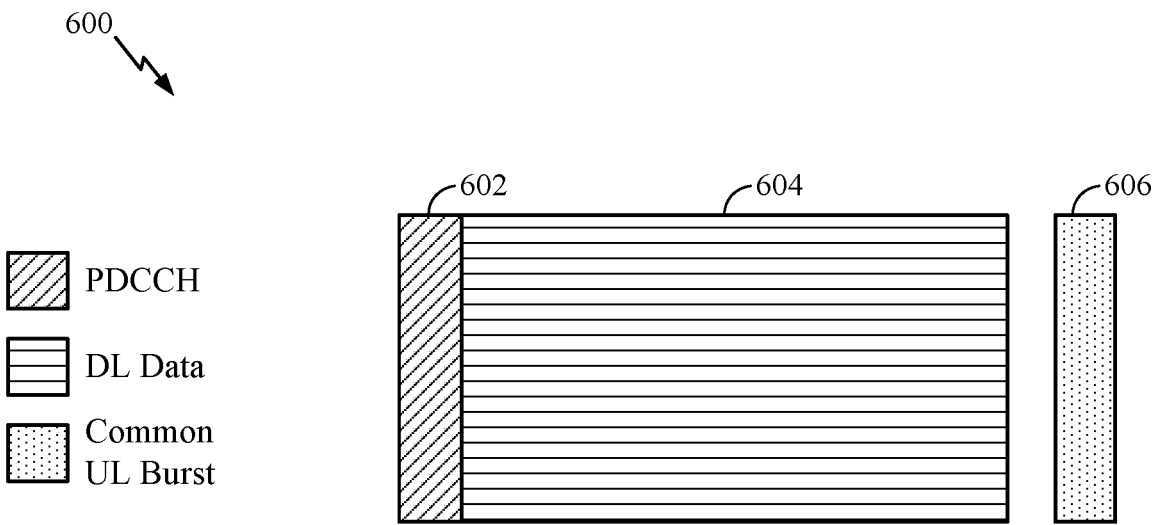
FIG. 6 illustrates an example of a downlink-centric (DL-centric) subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
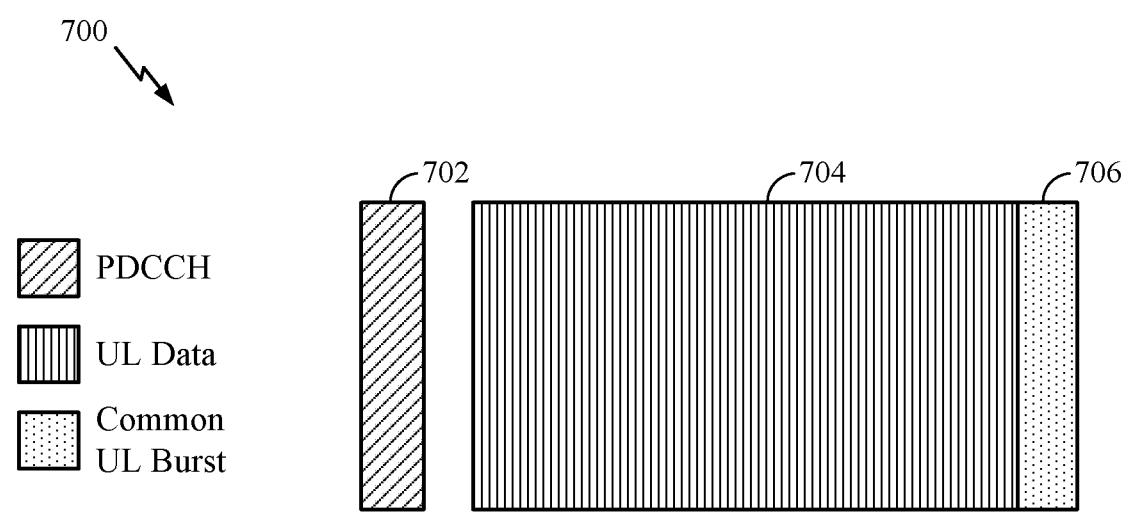
FIG. 7 illustrates an example of an uplink-centric (UL-centric) subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL data portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switchover from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Multiplexing Paging Signals with Synchronization Signals in New Radio

Under 3GPP's 5G wireless communication standards, a structure has been defined for NR synchronization (synch) signals (NR-SS), also referred to as NR synchronization channels. Under 5G, a set of consecutive OFDM symbols carrying different types of synch signals (e.g., primary synchronization signal (PSS), secondary synchronization signal (SSS), time synchronization signal (TSS), PBCH) forms an SS block. In some cases, a set of one or more SS blocks may form an SS burst. In addition, different SS blocks may be beamformed differently, for example, transmitted on different beams in different directions. In an aspect, transmitting SS blocks in different directions achieves beam-sweeping for synch signals, which may be used by a UE to quickly identify and acquire a cell. Further, one or more of the channels in an SS block may be used for measurements. Such measurements may be used for various purposes such as radio link management (RLM), beam management, etc. For example, a UE may measure the cell quality and report the quality back in the form of a measurement report, which may be used by the base station for beam management and other purposes.

Figure 8:
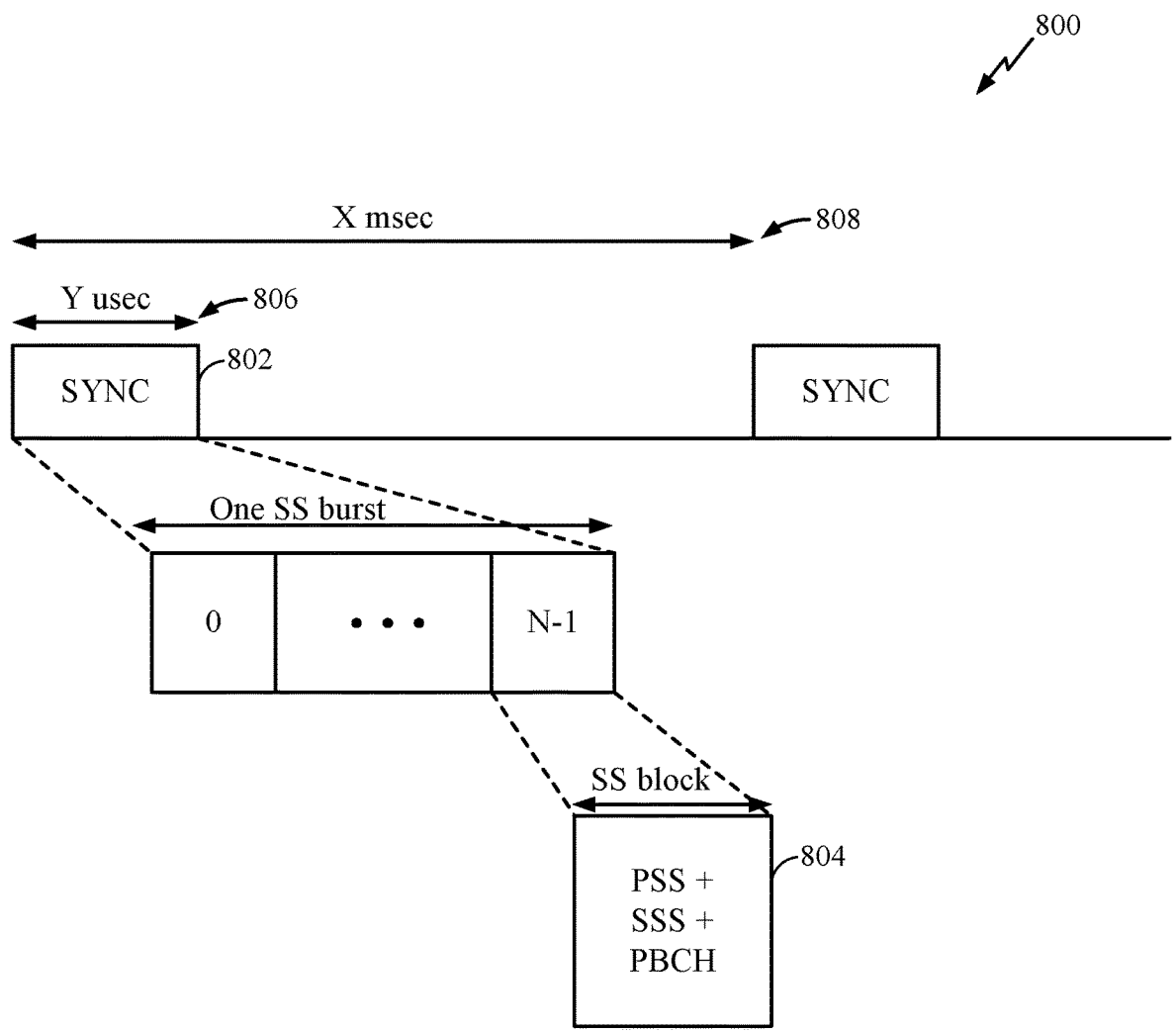
FIG. 8 illustrates an example transmission timeline, in accordance with certain aspects of the present disclosure.

FIG. 8 illustrates an example transmission timeline 800 of synchronization signals for a new radio telecommunications system, in accordance with aspects of the present disclosure. A BS, such as BS 110 shown in FIG. 1, may transmit an SS burst 802 during a period 806 of Y μsec, in accordance with certain aspects of the present disclosure. Each SS burst 802 may include N SS blocks 804 with indices of zero to N−1. For example, an SS burst 802 may include up to 64 SS blocks for a frequency band of 6 GHz or above. In an aspect, the SS blocks of an SS burst may not be consecutive within the SS burst. As noted above a BS may transmit the same or different SS blocks of an SS burst using different transmit beams in different directions (e.g., for beam-sweeping). Each SS block may include, for example, a primary synchronization signal (PSS), a secondary synchronization signal (SSS), and one or more physical broadcast channels (PBCHs), also referred to as synchronization channels. The BS may transmit SS bursts on a periodic basis, with a period 808 of X msec.

Figure 9:
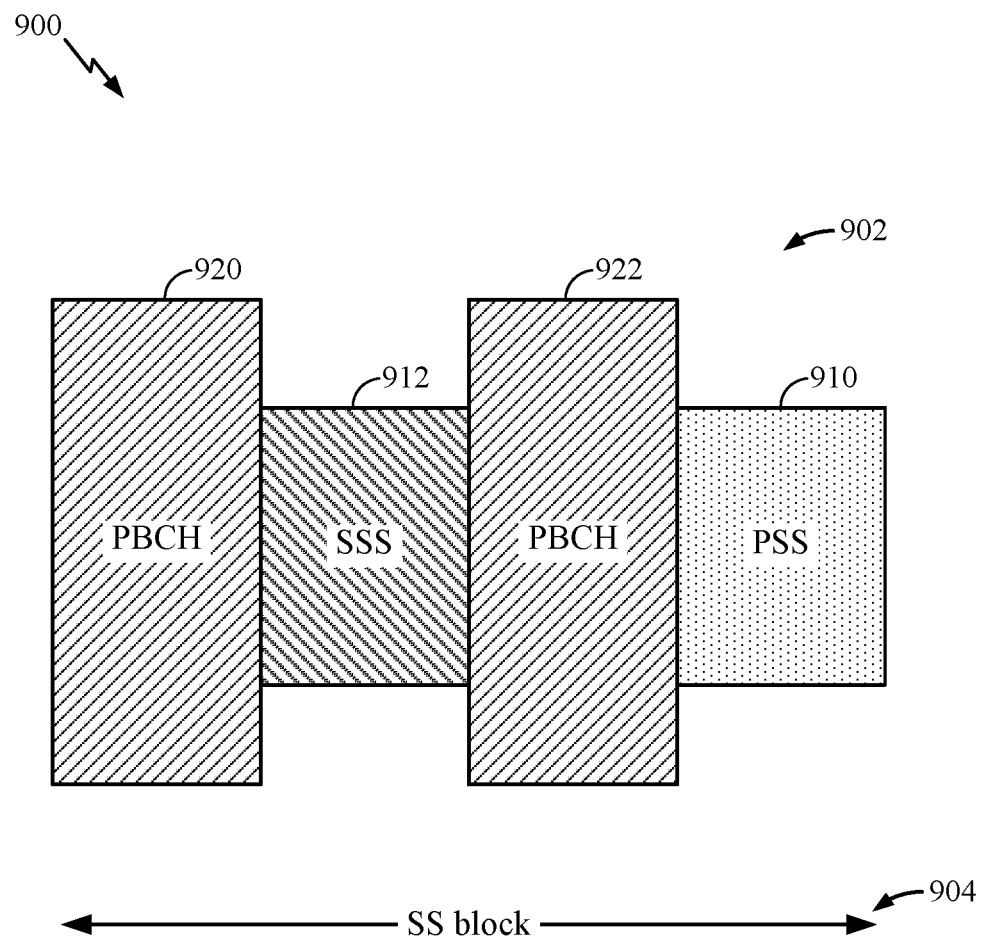
FIG. 9 illustrates an example resource mapping, in accordance with certain aspects of the present disclosure.

FIG. 9 illustrates an example resource mapping 900 for an exemplary SS block 902, in accordance with aspects of the present disclosure. The exemplary SS block 902 may be transmitted by a BS, such as BS 110 in FIG. 1, over a period 904 (e.g., Y μsec, as shown in FIG. 8). The exemplary SS block 902 includes a PSS 910, an SSS 912, and two PBCHs 920 and 922, although the disclosure is not so limited, and an SS block may include more or fewer synchronization signals and synchronization channels. In an aspect, the SS block may include DMRS (Demodulation Reference Signals) for PBCH. As illustrated, a transmission bandwidth (B1) of the PBCHs may be different from a transmission bandwidth (B2) of the synchronization signals. For example, the transmission bandwidth of the PBCHs may be 288 tones, while the transmission bandwidth of the PSS and SSS may be 127 tones.

In certain aspects, paging may be used by base stations (e.g., gNBs) to initiate a connection setup with a UE in RRC-idle mode. Paging may also be used by base stations to inform a UE in RRC-idle mode or RRC-connected mode about a change in system information. Generally, a base station transmits paging signals to a UE at configured paging occasions. The base station generally indicates to the UE information regarding the configured paging occasions in which the base station is to transmit paging signals, so that the UE may monitor the paging occasions to receive the paging signals. In an aspect, transmitting paging signals during configured paging occasions allows the UE to implement an efficient ON-OFF schedule, wherein the UE (e.g., in RRC-idle mode) turns on only at the configured paging occasions to receive pages from a base station.

In NR systems, like synchronization signals, paging signals are also broadcasted because the locations of UEs (e.g., in RRC-idle mode) is unknown. So, in high frequency bands (e.g., above 6 GHz) where transmissions are beamformed, paging transmissions are directional. Since the paging signals, like synchronization signals, are broadcasted, they need to be transmitted via beam sweeping like synchronization signals. For beam sweeping, a base station (e.g., gNB) transmits beams in different direction to cover a sufficient angular region. However, beam sweeping requires a large resource overhead which may not be optimal and may lead to inefficiencies including reduced throughput.

One solution to reduce resource overhead as a result of beam sweeping while transmitting paging signals is to multiplex paging signals with synchronization signals. For example, paging signals may be frequency division multiplexed (FDM) with synchronization signals.

However, there may be certain limitations and drawbacks to multiplexing (e.g., FDM) paging signals and synchronization signals. For example, the FDM of paging and synchronization signals may be limited by the bandwidth supported by the base station and/or the UEs served by the base stations. For example, a base station and/or one or more UEs served by the base station may only support a minimum bandwidth that is not sufficient for FDM of the paging and synchronization signals. Thus, if the bandwidth required to FDM paging and synchronization signals is larger than the bandwidth supported by a base station and/or at least one UE served by the base station, the base station may not be able to FDM paging the synchronization signals. For example, in sub-6 GHz frequency bands, the minimum supported bandwidth may be 5 MHz and the SS block (e.g., PBCH in the SS block) may occupy 4.32 MHz of the supported bandwidth. Thus, there may not be sufficient bandwidth available for FDM of paging and synchronization signals, especially if the base station and/or the UE only supports the minimum bandwidth.

In certain aspects, multiplexing (e.g., FDM) paging and synchronization signals may adversely affect the performance of synchronization signals. For example, in order to transmit multiplexed paging and synchronization signals the base station may have to split its power between paging signals and synchronization signals. As a result the base station may not be able to transmit the synchronization signals with full power as it would do when transmitting the synchronization signals not multiplexed with other signals. The multiplexing may increase PAPR (peak to average power ratio) of the transmitted paging and synchronization signals, which signals otherwise may benefit from their low PAPR properties. The low PAPR properties of the paging and synchronization signals may be lost due to multiplexing these signals together.

In certain aspects, the performance of multiplexed (e.g., FDM) paging and synchronization signals may be limited by a limited beamforming capability of at least one of the base station or one or more UEs served by the base station. For example, due to limited beamforming capability, the base station and/or UE(s) may have to use the same beams to transmit or receive the multiplexed signals. Sometimes, it may be beneficial to transmit and/or receive the paging signals and synchronization signals on intended beams (e.g., beams intended for transmission/reception of synch signals or paging signals). Limited beamforming capability may force a base station and/or UE to transmit and/or receive respectively the paging and synchronization signals in the same beam, rather than their intended beams.

Certain aspects of the present disclosure discuss techniques for multiplexing paging signals and synchronization signals based on at least one of a capability of a base station, a capability of a UE served by the base station, an operating frequency bandwidth, or a combination of tone spacings of the paging signals and the synchronization signals.

Figure 10:
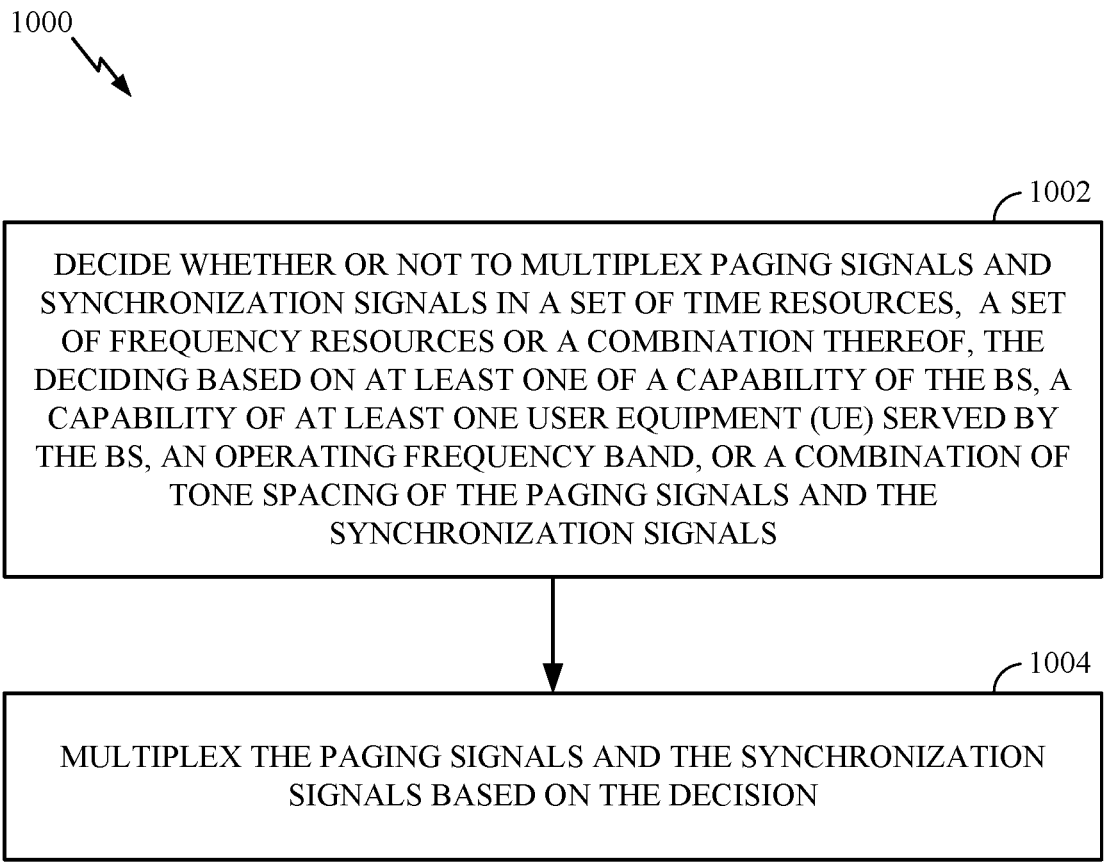
FIG. 10 illustrates example operations performed by a base station (BS) (e.g, gNB) for multiplexing paging signals and synchronization signals in NR, in accordance with certain aspects of the present disclosure.

FIG. 10 illustrates example operations 1000 performed by a base station (BS) (e.g, gNB) for multiplexing paging signals and synchronization signals in NR, in accordance with certain aspects of the present disclosure. Operations 1000 being, at 1002, by deciding whether or not to multiplex paging signals and synchronization signals in a set of time resources, a set of frequency resources or a combination thereof, the deciding based on at least one of a capability of the BS, a capability of at least one UE served by the BS, an operating frequency band, or a combination of tone spacings of the paging signals and the synchronization signals. At 1004, the BS multiplexes the paging signals and the synchronization signals based on the decision.

In certain aspects, the capability of the BS may include a bandwidth (e.g., minimum bandwidth) supported by the BS, a power (e.g., minimum power) at which the BS can transmit signals, or beamforming capabilities of the BS including number of antenna ports available at the BS and number of antenna elements subarrays available at the BS. The capability of the at least one UE may include a bandwidth (e.g., minimum bandwidth) supported by the UE, or beamforming capabilities of the UE including number of antenna ports available at the UE and number of antenna elements subarrays available at the UE.

In certain aspects, the paging signals include a paging grant that schedules a paging message. In an aspect, the paging grant is conveyed via PDCCH and the paging message is conveyed via PDSCH.

In certain aspects, the BS frequency division multiplexes the paging message and the synchronization signals, wherein the paging message and the synchronization signals are assigned the same time resources (i.e., overlap in time domain) but different frequency resources. In certain aspects, the BS time division multiplexes the paging grant and the synchronization signals, wherein the paging grant and the synchronization signals are assigned different time resources (i.e., do not overlap in time domain).

In an aspect, the multiplexing includes frequency division multiplexing (FDM) the paging signals and the synchronization signals. In certain aspects the BS may decide to FDM the paging signals and the synchronization signals if both the BS and at least one UE served by the BS at least supports a minimum bandwidth required for FDM of the paging and synchronization signals. In other words, the BS may decide to FDM the paging and synchronization signals if both the BS and the UE are capable of communicating over a sufficiently large bandwidth for supporting the FDM of the paging and synchronization signals.

In certain aspects, the BS may decide to multiplex (e.g, FDM) the paging and synchronization signals if the BS is capable of transmitting the synchronization signals with a minimum required quality, for example, regardless of the multiplexing. For example, the BS may decide to multiplex if the BS may transmit the synchronization signals at least a minimum power even after multiplexing with paging signals ensuring adequate quality of performance for the synchronization signals.

In certain aspects, the BS may decide to multiplex the paging and synchronization signals if the BS and/or UE(s)

served by the BS do not have limited beamforming capabilities that may adversely affect beamforming performance of the multiplexed paging and synchronization signals. For example, the BS may decide to multiplex the paging and synchronization signals if the BS can transmit the paging signals and the synchronization signals on intended transmit beams and the at least one UE served by the BS can receive the paging signals and the synchronization signals on intended receive beams.

Figure 11:
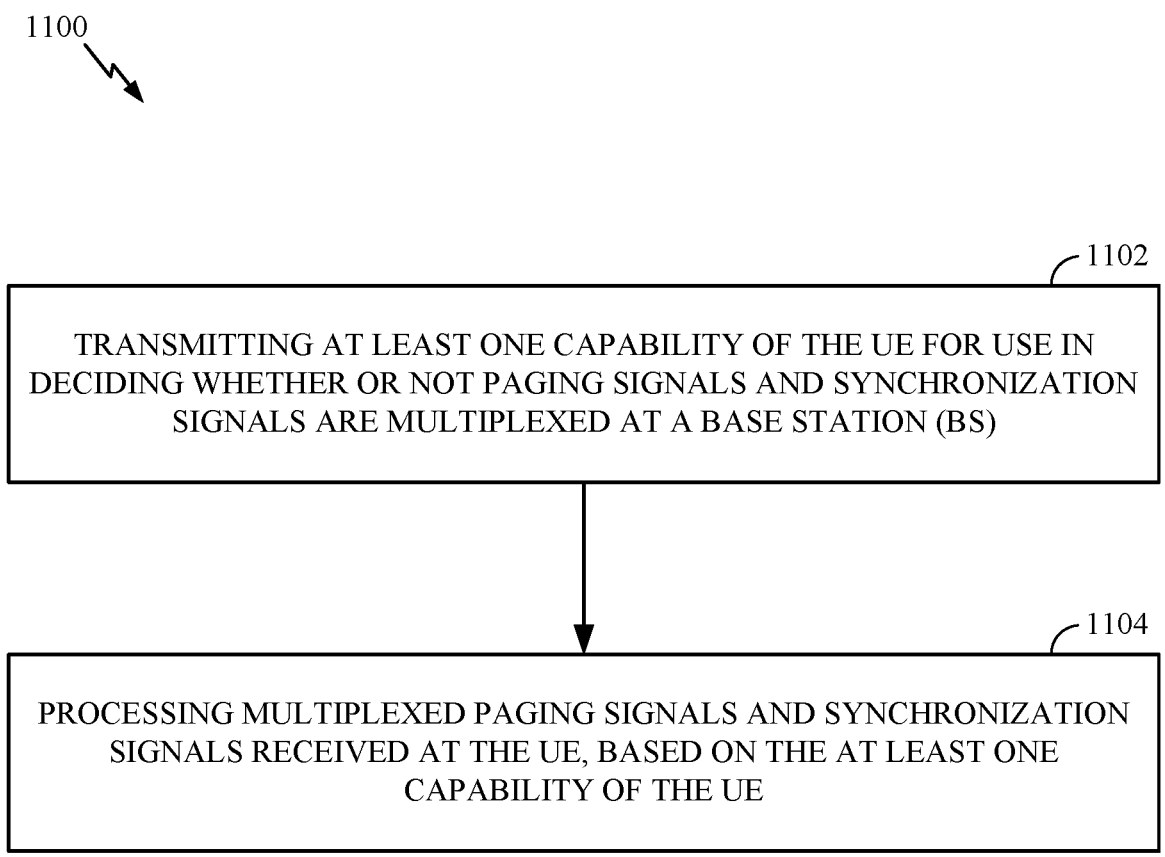
FIG. 11 illustrates example operations performed by a UE for received multiplexed paging signals and synchronization signals, in accordance with certain aspects of the present disclosure.

FIG. 11 illustrates example operations 1100 performed by a UE for receiving multiplexed paging signals and synchronization signals, in accordance with certain aspects of the present disclosure. Operations 1100 begin, at 1102, by transmitting at least one capability of the UE for using in deciding whether or not paging signals and synchronization signals are multiplexed at a base station (BS). At 1104, the UE processes multiplexed paging signals and synchronization signals received at the UE, based on the at least one capability of the UE.

As noted above, the capability of the UE may include a bandwidth (e.g., minimum bandwidth) supported by the UE, or beamforming capabilities of the UE including number of antenna ports available at the UE and number of antenna elements subarrays available at the UE.

In certain aspects, the BS may transmit a request to a UE to report information regarding the capabilities of the UE. In an aspect, the BS may transmit the request via at least one of Physical Downlink Control Channel (PDCCH), Radio Resource Control (RRC) signaling, Master Information Block (MIB), scheduling information, system information, or synchronization signals.

In certain aspects, a UE may transmit information regarding at least one capability of the UE via at least one of Physical Uplink Control Channel (PUCCH), Physical Uplink Shared Channel (PUSCH), or Message 1 or Message 3 of a Random Access Channel (RACH) procedure. In an aspect, the UE may transmit the information regarding its capability in response to receiving a request from the BS to report the information.

In certain aspect, the BS may decide whether or not to multiplex the paging and synchronization signals based on an operating frequency band. For example, the BS may decide to multiplex in a first frequency band and decide not to multiplex in a second frequency band. In an aspect, the decision regarding whether or not to multiplex the paging and the synchronization signals in a particular frequency band may be based on the capabilities of the BS and at least one UE operating in the frequency band. For example, the BS may support sufficient bandwidth in a frequency band A (e.g., over 6 GHz) for FDM of the paging and synchronization signals. Thus the BS may decide to FDM the paging and the synchronization signals in frequency band A. However, the BS may not support sufficient bandwidth in frequency band B (sub-6 GHz) to make the FDM possible. Thus, the BS may decide not to FDM in frequency band B.

In certain aspects, deciding whether or not to multiplex the paging signals and the synchronization signals based on the operating frequency band includes deciding whether or not to overlap a search space for the paging grant and the synchronization signals in at least one of a time domain, a frequency domain or a combination thereof. In an aspect, the search space for the paging grant corresponds to a default search space for the paging grant. In an aspect, the UE monitors the default search space for the paging grant if the UE has not been configured with a search space for the paging grant via system information.

In certain aspects, the BS may decide to multiplex (e.g., FDM) paging and synchronization signals in all or a subset of SS bursts. Further, the BS may decide to multiplex the paging and synchronization signals in all or a subset of SS blocks within a SS burst. For example, the BS may not want to compromise on synchronization signal performance in certain SS bursts and/or SS blocks and may decide not to multiplex the synchronization signals with paging signals in those SS burst and/or SS blocks. In an aspect, paging occasions may not be scheduled in every SS burst and/or SS block. Thus, the BS may not need to multiplex synchronization signals with paging signals in those SS bursts and/or SS blocks that do not include a paging occasion. In an aspect, certain SS bursts and/or SS blocks may be repetition of previous SS bursts and/or SS blocks. The BS may decide to multiplex the paging signals and synchronization only in the repeated SS bursts and/or SS blocks.

In certain aspects, the multiplexing (e.g., FDM) of the paging and the synchronization signals may include allocating a first set of frequency resources to the paging signals and a second set of frequency resources to the synchronization signals, wherein the first and the second sets of frequency resources do not overlap.

In certain aspects, the multiplexing (e.g., FDM) of the paging and the synchronization signals may include allocating a first set of frequency resources to the paging signals and a second set of frequency resources to the synchronization signals, wherein the first and the second sets of frequency resources overlap at least in part. In an aspect, the transmission of the paging signals is rate matched around the synchronization signals.

Figure 12:
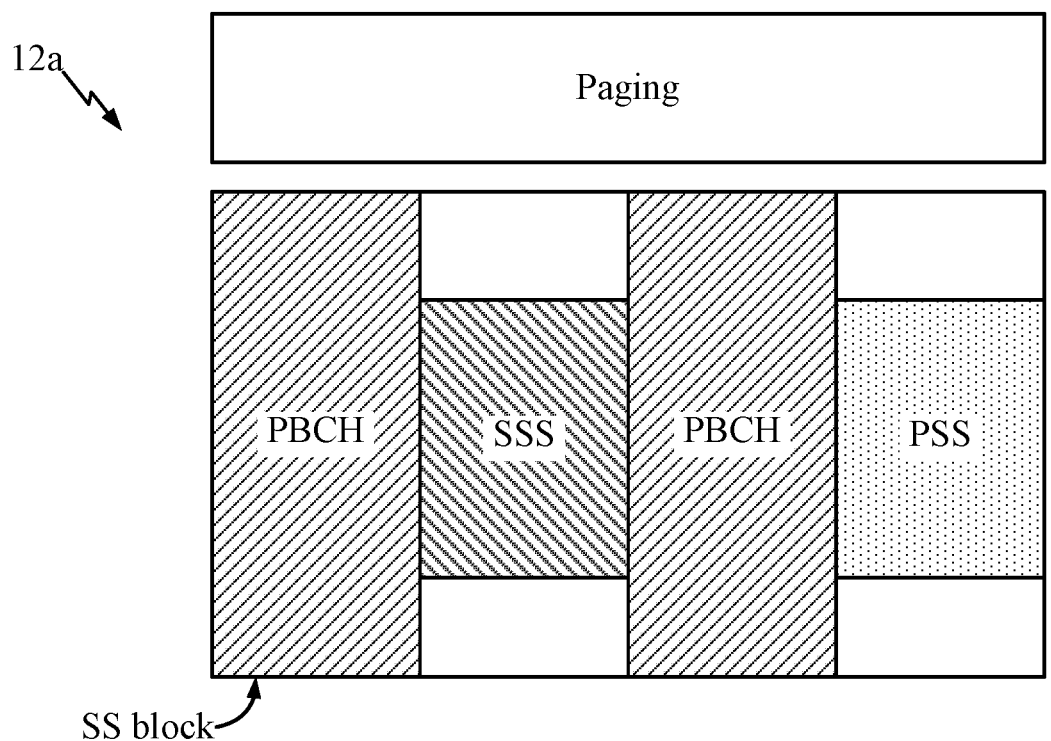
FIG. 12 illustrates FDM of paging signals and synchronization signals, in accordance with certain aspects of the present disclosure.
Figure 12:
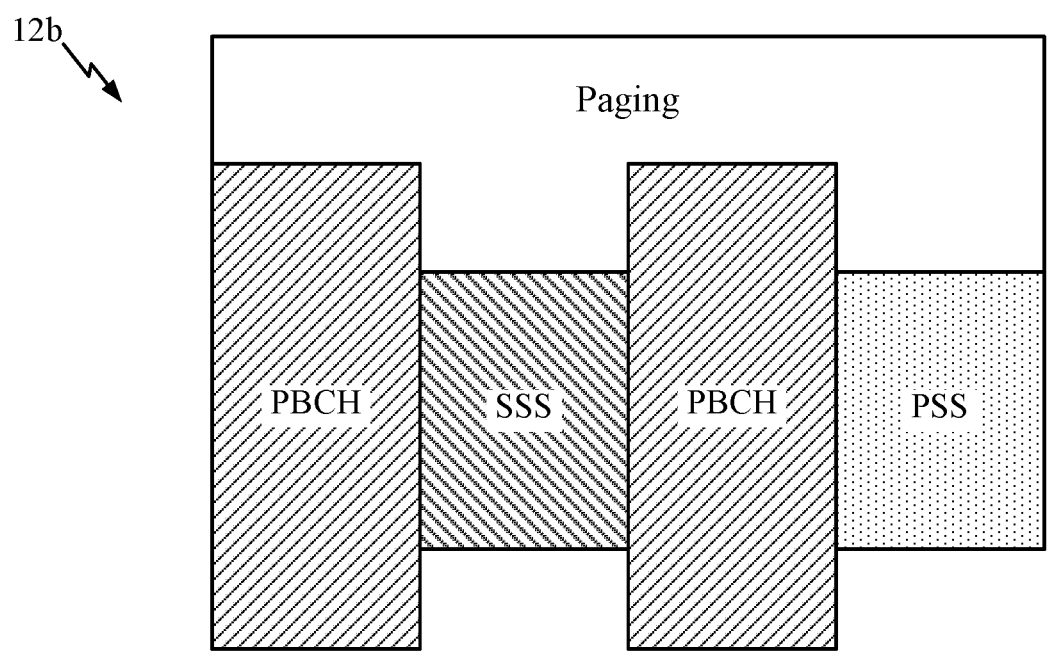

FIG. 12 illustrates FDM of paging signals and synchronization signals, in accordance with certain aspects of the present disclosure. 12a shows an SS block FDM with paging signals, wherein frequency resources assigned to the paging signals does not overlap the frequency resources assigned to the SS block. 12b shows also shows an SS block FDM with paging signals, but part of the frequency resources assigned to the paging signals overlap the frequency resources assigned to the SS block. For example, as shown in 12b certain portions of the paging signals occupy the same frequencies as the SS block, but in time periods in which those frequencies are not allocated to the SS block. For example, as shown in 12b, paging signals are allocated certain frequencies allocated to the SS block in time periods where these frequencies are not allocated to the SSS and the PSS in the SS block.

As mentioned previously in the portions of this disclosure, paging information needs to be beam swept to all directions of the cell. Synchronization signal needs to be beam swept as well. Frequency division multiplexing of synchronization signal and paging will reduce the total number of beam sweeps, thus reducing the resulting overhead. This overhead reduction may be especially important in over-6 GHz network where gNB might not be able to multiplex regular DL data and paging/synchronization signals in the frequency domain due to analog beamforming constraint.

However, there are some potential drawbacks of frequency division multiplexing of paging and synchronization signal.

Based on the latest agreement, the bandwidth of PBCH in sub-6 GHz will be 4.32 MHz. The carrier bandwidth for some operators is 5 MHz. If paging is FDMed with synchronization signal, UEs of these operators may not be able to receive paging and synchronization signal simultaneously.

In millimeter wave (MMW) band, frequency division multiplexing of data and synchronization signal may not be feasible due to analog beamforming constraints at gNB. By avoiding FDM, PAPR advantage may be provided to PSS signal which may be very beneficial in MMW band where path loss is high.

Time division multiplexing of paging and synchronization signals allow UE to wake up slightly before the paging occasion and train based on SSS and the DMRS of PBCH. This may reduce UE's total wake up time if it needs to receive paging signal in a beamformed manner to meet link budget.

Tone spacing of paging and synchronization signals may be different. Frequency division multiplexing of paging and synchronization signal will force UE to simultaneously process signals with different tone spacings.

Thus, owing to the above drawbacks, in certain aspects, frequency division multiplexing of synchronization and paging signals may impact the UEs whose minimum bandwidth is small. Frequency division multiplexing of synchronization and paging signals may prohibit gNBs from obtaining PAPR advantage and performing power boosting to meet link budget of synchronization signals. Time division multiplexing of paging and synchronization signals allow UE to wake up slightly before receiving paging signal; train its RX beams during SYNC reception and find the best RX beam to receive paging signal. Tone spacing of paging and synchronization signals may be different, and frequency division multiplexing of paging and synchronization signal will force UEs to simultaneously process signals with different tone spacing.

Based on these pros and cons, NR should limit frequency division multiplexing of paging and synchronization signals to over-6 GHz band only. Besides, even in over-6 GHz band, paging occasion of a UE should be frequency division multiplexed with SS blocks only if the UE has the capability to receive signal outside of the SSS bandwidth and if paging and synchronization signal are transmitted with the same tone spacing (e.g. 120 kHz).

In certain aspects, in over-6 GHz, gNB may configure frequency division multiplexing of paging and synchronization signal based on: 1) UE capability; i.e., if UE can receive signal in bandwidth outside of SS block; 2) Selected tone spacings; i.e. paging and synchronization signals are transmitted with same tone spacing. In others, frequency division multiplexing of paging and synchronization is allowed only if at least one of the UE can receive signal in bandwidth outside of SS block and if the paging and synchronization signals are transmitted with same tone spacing (or subcarrier spacing).

In certain aspects, the BS may decide whether or not to multiplex the paging signals and the synchronization signals based on a combination of the tone spacings. For example, the BS may decide to frequency division multiplex the paging grant and the synchronization signals by overlapping the paging grant and the synchronization signals in the time domain if the tone spacings of the paging grant and the synchronization signals are the same. In an aspect, the BS may decide not to overlap the paging grant and the synchronization signals in the time domain if the tone spacings of the paging grant and the synchronization signals are different. In an aspect, overlapping in time domain includes assigning same time resources but different frequency resources (e.g., different frequencies). Not overlapping in time domain includes assigning different time resources but assigning same frequency resources. In an aspect, the paging grant corresponds to a paging grant transmitted through a default search space.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for multiplexing, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g.,

RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a Base Station (BS), comprising:
deciding whether or not to multiplex paging signals and synchronization signals in a set of time resources, a set of frequency resources or a combination thereof, the deciding based on a capability of at least one User Equipment (UE) served by the BS, an operating frequency band, or a combination of tone spacings of the paging signals and tone spacings of the synchronization signals, wherein deciding whether or not to multiplex based on the operating frequency and includes deciding whether or not to overlap a search space for a paging grant and the synchronization signals in at least one of a time domain, a frequency domain or a combination thereof, wherein the paging signals include the paging grant that schedules a paging message, wherein the paging grant is conveyed via a Physical Downlink Control Channel (PDCCH) and the paging message is conveyed via a Physical Downlink Shared Channel (PDSCH); and
multiplexing the paging signals and the synchronization signals based on the decision.

2. The method of claim 1, wherein the multiplexing comprises frequency division multiplexing the paging message and the synchronization signals, wherein the paging message and the synchronization signals are assigned the same time resources but different frequency resources.

3. The method of claim 2, wherein the multiplexing comprises time division multiplexing the paging grant and the synchronization signals, wherein the paging grant and the synchronization signals are assigned different time resources.

4. The method of claim 1, wherein deciding whether or not to multiplex based on a combination of the tone spacings of the paging signals and the tone spacings of the synchronization signals include deciding, in response to determining that the tone spacings of the paging grant are the same as the tone spacings of the syncrhonizaiton signals, to frequency division multiplex the paging grant and the synchronization signals by overlapping the paging grant and the synchronization signals in the time domain.

5. The method of claim 4, wherein deciding whether or not to multiplex based on a combination of the tone spacings of the paging signals and the tone spacings of the synchronization signals includes deciding, in response to determining that the tone spacings of the paging grant are different than the tone spacings of the synchronization signals, not to overlap the paging grant and the synchronization signals in the time domain.

6. The method of claim 4, wherein the paging grant corresponds to a paging grant transmitted through a default search space.

7. The method of claim 1, wherein the search space for the paging grant corresponds to a default search space for the paging grant.

8. The method of claim 1, wherein the multiplexing includes frequency division multiplexing (FDM) the paging signals and the synchronization signals.

9. The method of claim 8, wherein the deciding whether or not to overlap the search space for the paging grant and the synchronization signals comprises deciding to FDM the paging signals and the synchronization signals if both the BS and the at least one UE at least support communication over a minimum bandwidth required for the FDM.

10. The method of claim 8, wherein the deciding whether or not to overlap the search space for the paging grant and the synchronization signals comprises deciding to FDM the paging signals and the synchronization signals in a subset of synchronization signal bursts (SS bursts).

11. The method of claim 8, wherein the deciding whether or not to overlap the search space for the paging grant and the synchronization signals comprises deciding to FDM the paging signals and the synchronization signals in a subset of synchronization signal blocks (SS blocks).

12. The method of claim 1, wherein the deciding whether or not to multiplex the paging signals and the synchronization signals comprises deciding to multiplex the paging signals and the synchronization signals if the BS can transmit the synchronization signals at least with a minimum quality.

13. The method of claim 12, wherein transmitting the synchronization signals with at least a minimum quality includes transmitting the synchronization signals at least at a minimum power.

14. The method of claim 1, wherein the deciding whether or not to multiplex the paging signals and the synchronization signals comprises deciding to multiplex the paging signals and the synchronization signals if the BS can transmit the paging signals and the synchronization signals on intended transmit beams and the at least one UE can receive the paging signals and the synchronization signals on intended receive beams.

15. The method of claim 1, further comprising:
transmitting a request to the at least one UE to report information regarding the capability of the at least one UE via at least one of the PDCCH, Radio Resource Control (RRC) signaling, Master Information Block (MIB), scheduling information, system information, or synchronization signals.

16. The method of claim 1, further comprising:
receiving information regarding the capability of the at least one UE via at least one of Physical Uplink Control Channel (PUCCH), Physical Uplink Shared Channel (PUSCH), or Message 1 or Message 3 of a Random Access Channel (RACH) procedure.

17. The method of claim 1, wherein the deciding whether or not to multiplex based on an operating frequency band comprises deciding to frequency division multiplex the paging signals and the synchronization signals in a first frequency band and deciding not to multiplex the paging signals and the synchronization signals in a second frequency band.

18. The method of claim 17, wherein the deciding whether or not to multiplex based on an operating frequency band is based on at least one of a capability of the BS to operate in the operating frequency band or the capability of the at least one UE, wherein the capability of the at least one UE comprises a capability of the at least one UE to operate in the operating frequency band.

19. The method of claim 17, where the first frequency band is over-6 GHz band and the second frequency band is sub-6 GHz band.

20. The method of claim 1, wherein the multiplexing comprises allocating a first set of frequency resources to the paging signals and a second set of frequency resources to the synchronization signals, wherein the first set and the second set do not overlap.

21. The method of claim 1, wherein the multiplexing comprises allocating a first set of frequency resources to the paging signals and a second set of frequency resources to the synchronization signals, wherein the first set and the second set overlap at least in part.

22. The method of claim 21, wherein transmission of the paging signals is rate matched around the synchronization signals.

23. The method of claim 1, wherein the synchronization signals include a synchronization signal block having Physical Broadcast Channel (PBCH), Primary Synchronization Signal (PSS) and Secondary Synchronization Signal (SSS).

24. A method of wireless communication, by a User Equipment (UE), comprising:
transmitting at least one capability of the UE for use in deciding whether or not paging signals and synchronization signals will be multiplexed at a base station (BS);
receiving information indicating that the paging signals and the synchronization signals wil be multiplexed by the base station, the information indicating whether or not a search space for a paging grant and the synchronization signals overlap in at least one of a time domain, a frequency domain or a combination thereof, wherein the paging signals include the paging grant that schedules a paging message, wherein the paging grant is received via a Physical Downlink Control Channel (PDCCH) and the paging message is received via a Physical Downlink Shared Channel (PDSCH); and
processing multiplexed paging signals and synchronization signals received at the UE, based on the received information.

25. The method of claim 24, further comprising receiving a request to report the at least one capability of the UE, wherein the transmitting is in response to the request.

26. The method of claim 25, wherein receiving the request comprises receiving the request from the BS via at least one of Physical Downlink Control Channel (PDCCH), Radio Resource Control (RRC) signaling, Master Information Block (MIB), scheduling information, system information, or synchronization signals.

27. The method of claim 24, wherein the transmitting comprises transmitting the at least one capability of the UE via at least one of Physical Uplink Control Channel (PUCCH), Physical Uplink Shared Channel (PUSCH), or Message 1 or Message 3 of a Random Access Channel (RACH) procedure.

28. The method of claim 24, wherein the at least one capability includes at least one of a minimum bandwidth supported by the UE, a number of antenna ports available at the UE or a number of antenna elements subarrays available at the UE.

29. The method of claim 24, wherein the processing includes processing the paging signals and the synchronization signals received in a set of time resources, a set of frequency resources or a combination thereof.

30. An apparatus for wireless communication by a Base Station (BS), comprising:

means for deciding whether or not to multiplex paging signals and synchronization signals in a set of time resources, a set of frequency resources or a combination thereof, the deciding based on a capability of at least one User Equipment (UE) served by the BS, an operating frequency band, or a combination of tone spacings of the paging signals and tone spacings of the synchronization signals, wherein deciding whether or not to multiplex based on the operating frequency band includes deciding whether or not to overlap a search space for a paging grant and the synchronization signals in at least one of a time domain, a frequency domain or a combination thereof, wherein the paging signals include the paging grant that schedules a paging message, wherein the paging grant is conveyed via a Physical Downlink Control Channel (PDCCH) and the paging message is conveyed via a Physical Downlink Shared Channel (PDSCH); and
means for multiplexing the paging signals and the synchronization signals based on the decision.

31. The apparatus of claim 30, wherein the means for multiplexing frequency division multiplexes the paging message and the synchronization signals, wherein the paging message and the synchronization signals are assigned the same time resources but different frequency resources.

32. The apparatus of claim 31, wherein the means for multiplexing time division multiplexes the paging grant and the synchronization signals, wherein the paging grant and the synchronization signals are assigned different time resources but same frequency resources.

33. The apparatus of claim 30, wherein the means for deciding whether or not to multiplex based on a combination of the tone spacings of the paging signals and the tone spacings of the synchronization signals is configured to decide, in response to determining that the tone spacings of the paging grant are the same as the tone spacings of the synchronization signals, to frequency division multiplex the paging grant and the synchronization signals by overlapping the paging grant and the synchronization signals in the time domain.

34. The apparatus of claim 33, wherein the means for deciding whether or not to multiplex based on a combination of tone spacings is configured to decide, in response to determining that the tone spacings of the paging grant are different than the tone spacings of the syncronization signals, not to overlap the paging grant and the synchronization signals in the time domain.

35. The apparatus of claim 33, wherein the paging grant corresponds to a paging grant transmitted through a default search space.

36. The apparatus of claim 30, wherein the search space for the paging grant corresponds to a default search space for the paging grant.

37. The apparatus of claim 30, wherein the means for multiplexing is configured to frequency division multiplex (FDM) the paging signals and the synchronization signals.

38. The apparatus of claim 37, wherein the means for deciding is configured to decide to FDM the paging signals and the synchronization signals if both the BS and the at least one UE at least support communication over a minimum bandwidth required for the FDM.

39. The apparatus of claim 37, wherein the means for deciding is configured to decide to FDM the paging signals and the synchronization signals in a subset of synchronization signal bursts (SS bursts).

40. The apparatus of claim 37, wherein the means for deciding is configured to decide to FDM the paging signals and the synchronization signals in a subset of synchronization signal blocks (SS blocks).

41. The apparatus of claim 30, wherein the means for deciding is configured to decide to multiplex the paging signals and the synchronization signals if the BS can transmit the synchronization signals at least with a minimum quality.

42. The apparatus of claim 41, wherein transmitting the synchronization signals with at least a minimum quality includes transmitting the synchronization signals at least at a minimum power.

43. The apparatus of claim 30, wherein the means for deciding is configured to decide to multiplex the paging signals and the synchronization signals if the BS can transmit the paging signals and the synchronization signals on intended transmit beams and the at least one UE can receive the paging signals and the synchronization signals on intended receive beams.

44. The apparatus of claim 30, further comprising:
means for transmitting a request to the at least one UE to report information regarding the capability of the at least one UE via at least one of the PDCCH, Radio Resource Control (RRC) signaling, Master Information Block (MIB), scheduling information, system information, or synchronization signals.

45. The apparatus of claim 30, further comprising:
means for receiving information regarding the capability of the at least one UE via at least one of Physical Uplink Control Channel (PUCCH), Physical Uplink Shared Channel (PUSCH), or Message 1 or Message 3 of a Random Access Channel (RACH) procedure.

46. The apparatus of claim 30, wherein the means for deciding whether or not to multiplex based on an operating frequency band is configured to decide to frequency division multiplex the paging signals and the synchronization signals in a first frequency band and deciding not to multiplex the paging signals and the synchronization signals in a second frequency band.

47. The apparatus of claim 46, wherein the deciding whether or not to multiplex based on an operating frequency band is configured to make the decision based on at least one of a capability of the BS to operate in the operating frequency band or the capability of the at least one UE, wherein the capability of the at least one UE comprises a capability of the at least one UE to operate in the operating frequency band.

48. The apparatus of claim 46, wherein the first frequency band is over-6 GHz band and the second frequency band is sub-6 GHz band.

49. The apparatus of claim 30, wherein the means for multiplexing is configured to allocate a first set of frequency resources to the paging signals and a second set of frequency resources to the synchronization signals, wherein the first set and the second set do not overlap.

50. The apparatus of claim 30, wherein the means for multiplexing is configured to allocate a first set of frequency resources to the paging signals and a second set of frequency resources to the synchronization signals, wherein the first set and the second set overlap at least in part.

51. The apparatus of claim 50, wherein transmission of the paging signals is rate matched around the synchronization signals.

52. The apparatus of claim 30, wherein the synchronization signals include a synchronization signal block having Physical Broadcast Channel (PBCH), Primary Synchronization Signal (PSS) and Secondary Synchronization Signal (SSS).

53. An apparatus for wireless communication, by a User Equipment (UE), comprising:
means for transmitting at least one capability of the UE for use in deciding whether or not paging signals and synchronization signals will be multiplexed at a base station (BS);
means for receiving information indicating that the paging signals and the synchronization signals will be multiplexed by the base station, the information indicating whether or not a search space for a paging grant and the synchronization signals overlap in at least one of a time domain, a frequency domain or a combination thereof, wherein the paging signals include the paging grant that schedules a paging message, wherein the paging grant is received via a Physical Downlink Control Channel (PDCCH) and the paging message is received via a Physical Downlink Shared Channel (PDSCH); and
means for processing multiplexed paging signals and synchronization signals received at the UE, based on the received information.

54. The apparatus of claim 53, further comprising means for receiving a request to report the at least one capability of the UE, wherein the transmitting is in response to the request.

55. The apparatus of claim 54, wherein the means for receiving the request is configured to receive the request from the BS via at least one of Physical Downlink Control Channel (PDCCH), Radio Resource Control (RRC) signaling, Master Information Block (MIB), scheduling information, system information, or synchronization signals.

56. The apparatus of claim 53, wherein the means for transmitting is configured to transmit the at least one capability of the UE via at least one of Physical Uplink Control Channel (PUCCH), Physical Uplink Shared Channel (PUSCH), or Message 1 or Message 3 of a Random Access Channel (RACH) procedure.

57. The apparatus of claim 53, wherein the at least one capability includes at least one of a minimum bandwidth supported by the UE, a number of antenna ports available at the UE or a number of antenna elements subarrays available at the UE.

58. The apparatus of claim 53, wherein the means for processing is configured to process the paging signals and the synchronization signals received in a set of time resources, a set of frequency resources or a combination thereof.

59. An apparatus for wireless communication by a Base Station (BS), comprising:
at least one processor configured to:
decide whether or not to multiplex paging signals and synchronization signals in a set of time resources, a set of frequency resources or a combination thereof, the deciding based on at least one of a capability of at least one User Equipment (UE) served by the BS, an operating frequency band, or a combination of tone spacings of the paging signals and tone spacings of the synchronization signals, wherein deciding whether or not to multiplex based on the operating frequency band includes deciding whether or not to overlap a search space for a paging grant and the synchronization signals in at least one of a time domain, a frequency domain or a combination thereof, wherein the paging signals include the paging grant that schedules a paging message, wherein the paging grant is conveyed via a Physical Downlink Control Channel (PDCCH) and the paging message is conveyed via a Physical Downlink Shared Channel (PDSCH); and multiplex the paging signals and the synchronization signals based on the decision; and a memory coupled to the at least one processor.

60. The apparatus of claim 59, wherein the at least one processor is configured to multiplex by frequency division multiplexing the paging message and the synchronization signals, wherein the paging message and the synchronization signals are assigned the same time resources but different frequency resources.

61. The apparatus of claim 60, wherein the at least one processor is configured to multiplex by time division multiplexing the paging grant and the synchronization signals, wherein the paging grant and the synchronization signals are assigned different time resources but same frequency resources.

62. The apparatus of claim 59, wherein the at least one processor decides whether or not to multiplex based on a combination of the tone spacings of the paging signals and the tone spacings of the synchronization signals by deciding, in response to determining that the tone spacings of the paging grant are the same as the tone spacings of the synchronization signals, to frequency division multiplex the paging grant and the synchronization signals by overlapping the paging grant and the synchronization signals in the time domain.

63. The apparatus of claim 62, wherein the at least one processor decides whether or not to multiplex based on a combination of the tone spacings of the paging signals and the tone spacings of the synchronization signals by deciding, in response to determining that the tone spacings of the paging grant are different that the tone spacings of the synchronization signals, not to overlap the paging grant and the synchronization signals in the time domain.

64. The apparatus of claim 62, wherein the paging grant corresponds to a paging grant transmitted through a default search space.

65. The apparatus of claim 59, wherein the search space for the paging grant corresponds to a default search space for the paging grant.

66. The apparatus of claim 58, wherein the at least one processor is configured to frequency division multiplex (FDM) the paging signals and the synchronization signals.

67. The apparatus of claim 66, wherein the at least one processor is configured to decide to FDM the paging signals and the synchronization signals if both the BS and the at least one UE at least support communication over a minimum bandwidth required for the FDM.

68. The apparatus of claim 66, wherein the at least one processor is configured to decide to FDM the paging signals and the synchronization signals in a subset of synchronization signal bursts (SS bursts).

69. The apparatus of claim 66, wherein the at least one processor is configured to decide to FDM the paging signals and the synchronization signals in a subset of synchronization signal blocks (SS blocks).

70. The apparatus of claim 59, wherein the at least one processor is configured to decide to multiplex the paging signals and the synchronization signals if the BS can transmit the synchronization signals at least with a minimum quality.

71. The apparatus of claim 70, wherein the at least one processor is configured to transmit the synchronization signals with at least the minimum quality by transmitting the synchronization signals at least at a minimum power.

72. The apparatus of claim 59, wherein the at least one processor is configured to decide to multiplex the paging signals and the synchronization signals if the BS can transmit the paging signals and the synchronization signals on intended transmit beams and the at least one UE can receive the paging signals and the synchronization signals on intended receive beams.

73. The apparatus of claim 59, wherein the at least one processor is further configured to:

transmit a request to the at least one UE to report information regarding the capability of the at least one of the PDCCH, Radio Resource Control (RRC) signaling, Master Information Block (MIB), scheduling information, system information, or synchronization signals.

74. The apparatus of claim 59, wherein the at least one processor is further configured to:

receive information regarding the capability of the at least one UE via at least one of Physical Uplink Control Channel (PUCCH), Physical Uplink Shared Channel (PUSCH), or Message 1 or Message 3 of a Random Access Channel (RACH) procedure.

75. The apparatus of claim 59, wherein the at least one processor is configured to decide to frequency division multiplex the paging signals and the synchronization signals in a first frequency band and decide not to multiplex the paging signals and the synchronization signals in a second frequency band.

76. The apparatus of claim 75, wherein the at least one processor is configured to decide whether or not to multiplex in an operating frequency band based on at least one of a capability of the BS to operate in the operating frequency band or the capability of the at least one UE, wherein the cpability of the least one UE comprises a capability of the at least one UE to operate in the operating frequency band.

77. The apparatus of claim 75, wherein the first frequency band is over-6 GHz band and the second frequency band is sub-6 GHz band.

78. The apparatus of claim 59, wherein the at least one processor is configured to multiplex by allocating a first set of frequency resources to the paging signals and a second set of frequency resources to the synchronization signals, wherein the first set and the second set do not overlap.

79. The apparatus of claim 59, wherein the at least one processor is configured to multiplex by allocating a first set of frequency resources to the paging signals and a second set of frequency resources to the synchronization signals, wherein the first set and the second set overlap at least in part.

80. The apparatus of claim 79, wherein the at least one processor is configured to transmit the paging signals rate matched around the synchronization signals.

81. The apparatus of claim 59, wherein the synchronization signals include a synchronization signal block having Physical Broadcast Channel (PBCH), Primary Synchronization Signal (PSS) and Secondary Synchronization Signal (SSS).

82. An apparatus for wireless communication, by a User Equipment (UE), comprising:

at least one processor configured to:

transmit at least one capability of the UE for use in deciding whether or not paging signals and synchronization signals will be multiplexed at a base station (BS);

receive information indicating that the paging signals and the synchronization signals will be multiplexed by the base station, the information indicating whether or not a search space for a paging grant and the synchronization signals overlap in at least one of a time domain, a frequency domain or a combination thereof, wherein the paging signals include the paging grant that schedules a paging message, wherein the paging grant is received via a Physical Downlink Control Channel (PDCCH) and the paging message is received via a Physical Downlink Shared Channel (PDSCH); and process multiplexed paging signals and synchronization signals received at the UE, based on the received information; and a memory coupled to the at least one processor.

83. The apparatus of claim 82, wherein the at least one processor is further configured to receive a request to report the at least one capability of the UE, wherein the transmitting is in response to the request.

84. The apparatus of claim 83, wherein receiving the request comprises receiving the request from the BS via at least one of Physical Downlink Control Channel (PDCCH), Radio Resource Control (RRC) signaling, Master Information Block (MIB), scheduling information, system information, or the synchronization signals.

85. The apparatus of claim 82, wherein the at least one processor is configured to transmit by transmitting the at least one capability of the UE via at least one of Physical Uplink Control Channel (PUCCH), Physical Uplink Shared Channel (PUSCH), or Message 1 or Message 3 of a Random Access Channel (RACH) procedure.

86. The apparatus of claim 82, wherein the at least one capability includes at least one of a minimum bandwidth supported by the UE, a number of antenna ports available at the UE or a number of antenna elements subarrays available at the UE.

87. The apparatus of claim 82, wherein the at least one processor is configured to process by processing the paging signals and the synchronization signals received in a set of time resources, a set of frequency resources or a combination thereof.

* * * * *